United States Patent
Wu et al.

(10) Patent No.: US 7,195,092 B2
(45) Date of Patent: Mar. 27, 2007

(54) OCCUPANT RESTRAINT SYSTEM INCORPORATING ROTATABLE SEAT BACK

(75) Inventors: Fubang Wu, Rochester Hills, MI (US); Clifford C. Chou, Farmington Hills, MI (US); Brian Robert Spahn, Plymouth, MI (US); Shane A. Goodhall, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 10/708,377

(22) Filed: Feb. 27, 2004

(65) Prior Publication Data

US 2005/0189748 A1 Sep. 1, 2005

(51) Int. Cl.
*B60R 21/013* (2006.01)

(52) U.S. Cl. .................. 180/282; 280/733; 297/216.1
(58) Field of Classification Search ............. 180/282, 180/268; 280/735, 733, 806; 297/216.1
See application file for complete search history.

(56) References Cited

U.S. PATENT DOCUMENTS

| | | | |
|---|---|---|---|
| 3,865,398 A | 2/1975 | Woll | |
| 5,492,368 A | 2/1996 | Pywell et al. | |
| 5,810,417 A | 9/1998 | Jesadanont | |
| 5,839,753 A | 11/1998 | Yaniv et al. | |
| 5,851,055 A | 12/1998 | Lewis | |
| 6,076,887 A | 6/2000 | Andersson | |
| 6,126,194 A | 10/2000 | Yaniv et al. | |
| 6,155,601 A | 12/2000 | Cantor et al. | |
| 6,182,783 B1* | 2/2001 | Bayley ................. | 180/282 |
| 6,193,297 B1 | 2/2001 | Vandermolen | |
| 6,322,140 B1 | 11/2001 | Jessup et al. | |
| 6,336,656 B1 | 1/2002 | Romeo | |
| 6,378,898 B1* | 4/2002 | Lewis et al. ........... | 280/733 |
| 6,382,666 B1 | 5/2002 | Devonport | |
| 6,463,372 B1* | 10/2002 | Yokota et al. .......... | 701/45 |
| 6,547,273 B2 | 4/2003 | Grace et al. | |
| 6,666,292 B2* | 12/2003 | Takagi et al. .......... | 180/274 |
| 2001/0040065 A1 | 11/2001 | Takagi et al. | |
| 2002/0105176 A1 | 8/2002 | Hammer et al. | |
| 2002/0125701 A1 | 9/2002 | Devonport | |
| 2002/0171233 A1 | 11/2002 | Grace | |
| 2002/0188393 A1 | 12/2002 | Yokota et al. | |
| 2004/0212226 A1 | 10/2004 | Bethge et al. | |

* cited by examiner

*Primary Examiner*—Paul N. Dickson
*Assistant Examiner*—Timothy D. Wilhelm
(74) *Attorney, Agent, or Firm*—Frank A. MacKenzie; Artz & Artz, P.C.

(57) ABSTRACT

An occupant restraint system (11) for an automotive vehicle (10) includes a rollover sensor (30) that generates a rollover signal. A seat (12) having a seat base (16) rotatably coupled to a seat back (18) may be included in the occupant restraint system (11). A controller (26) is coupled to the rollover sensor (30) and seat base (16). The controller (26) controls the seat back (18) to move relative to the seat base in response to the rollover signal. The rollover control module (26) may also control the operation of an inflatable seat belt (36) to maintain the occupant's position relative to the seat back (18).

14 Claims, 2 Drawing Sheets

OCCUPANT RESTRAINT SYSTEM INCORPORATING ROTATABLE SEAT BACK

BACKGROUND OF INVENTION

The present invention relates to occupant restraint systems, and more particularly, to occupant restraint systems suitable for deployment in a rollover condition.

Rollover countermeasures are becoming increasingly popular in automotive vehicles. Typically, rollover countermeasures include side curtain airbags that are deployed to contain the occupant within the vehicle, to reduce occupant excursion and to mitigate occupant ejection and reduce contact injuries. Curtain airbags may reduce the possibility of injury from dynamic contact of the occupant with the interior. During rollovers, however, the roof is often crushed which reduce room between the occupant's head and the roof structure of the vehicle.

It would therefore be desirable to provide an occupant restraint system that increases the amount of headroom during a rollover event.

SUMMARY OF INVENTION

The present invention increases the amount of headroom available for the vehicle occupant by rotating the seat back relative to the seat base. By rotating the seat in a rearward manner, the top of the seat back moves downward and thus the occupant is provided more room than if the seat remained in an upright position.

In one aspect of the invention, an occupant restraint system for an automotive vehicle includes a rollover sensor that generates a rollover signal corresponding to a rolling movement of the vehicle, a seat having a seat base, and a seat back that is rotatably coupled to the seat base. A controller is coupled to the rollover sensor and the seat back to move the seat back in response to the rollover signal.

An additional feature to the above-mentioned system is that an seat integrated belt system which could be an inflatable shoulder belt, four point belt or a regular belt that may be employed to help urge the occupant into contact with the seat back and thus help move the occupant rearward along with the seat back.

In another aspect of the invention a method of restraining an occupant during a rollover event includes generating a rollover signal in response to a rolling movement of the vehicle. The method further includes rotating the seat back relative to the seat base in response to the rollover signal and deploying an inflatable shoulder belt in response to the rollover signal.

One advantage of the invention is that mechanisms currently found in automotive vehicles for motorized seat back movement may be easily modified to provide the rotating function.

Other advantages and features of the present invention will become apparent when viewed in light of the detailed description of the preferred embodiment when taken in conjunction with the attached drawings and appended claims.

DETAILED DESCRIPTION

Figure 1:
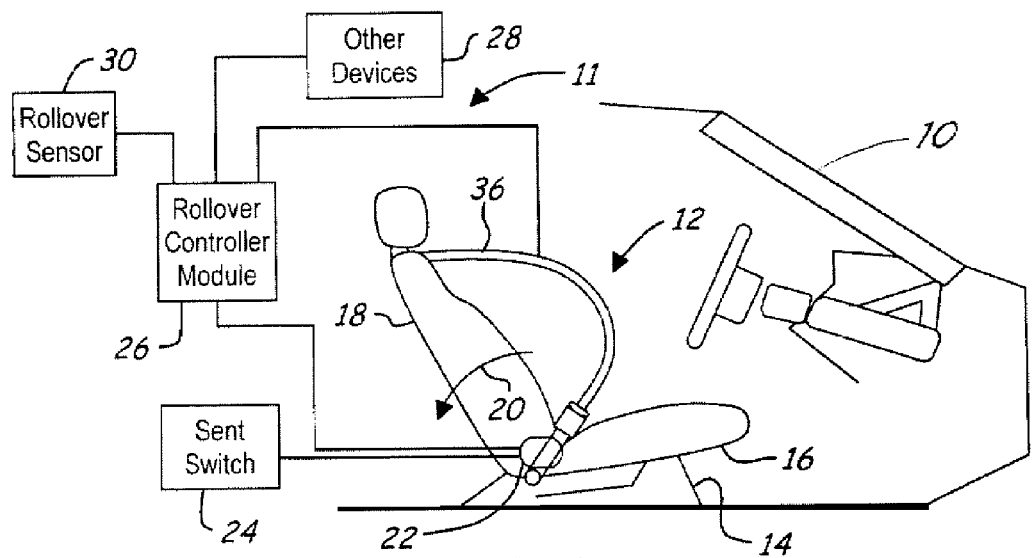
FIG. 1 is a side diagrammatic view of an occupant restraint system formed according to the present invention.

In the following figures the same reference numerals will be used to illustrate the same components.

The present invention is illustrated with respect to a rotatable seat back and an inflatable safety belt. Those skilled in the art will recognize that the system may include one or both of the inflatable safety belt or the rotating seat back.

Referring now to FIG. 1, an automotive vehicle 10 has an occupant restraint system 11 and a seat 12 mounted to the automotive vehicle 10 by a seat mount 14. Seat 12 has a seat base 16 and a seat back 18. Seat back 18 is rotatably mounted relative to seat base 16 as indicated by arrow 20. A motor 22 is used to rotate the seat back 18 relative to seat base 16. In normal operation, a seat switch 24 is operably coupled to the motor 22. A low current control signal is provided to the motor 22 to move the seat back 18 in either direction.

A rollover control module 26 is also coupled to motor 22. Rollover control module 26, as will be further described below, generates a high current control signal higher than that provided by seat switch 24 to control the rotation of seat back 18 in the direction indicated by arrow 20. The rollover control module 26 may also be coupled to other devices 28 such as a side curtain airbag or a roll stability control system. The rollover control module 26 is coupled to a rollover sensor 30. Although a single rollover sensor 30 is indicated, various sensors may be used to indicate or generate a rollover signal. The rollover signal is generated when the rollover sensor 30 senses that the vehicle is in a rolling motion that may cause the vehicle to roll over. The rollover sensors may include a yaw rate sensor, a roll rate sensor, a pitch rate sensor, lateral acceleration sensor, longitudinal acceleration sensor, a vertical acceleration sensor, a steering angle sensor, a GPS sensor, a vision system, or the like. Those skilled in the art will recognize that many ways for determining roll or the potential for rollover of the vehicle may be performed.

Rollover control module 26 may also be coupled to an inflatable seat belt 36. Inflatable seat belt 36 may, for example, be an inflatable shoulder belt. Inflatable seat belt 36 may be actuated at least in response to a roll signal from the rollover control module 26.

Rollover control module 26 may be a stand alone module or part of another safety system or vehicle system module. Rollover control module 26 may, for example, microprocessor-based programmed to perform the various functions described below.

Figure 2:
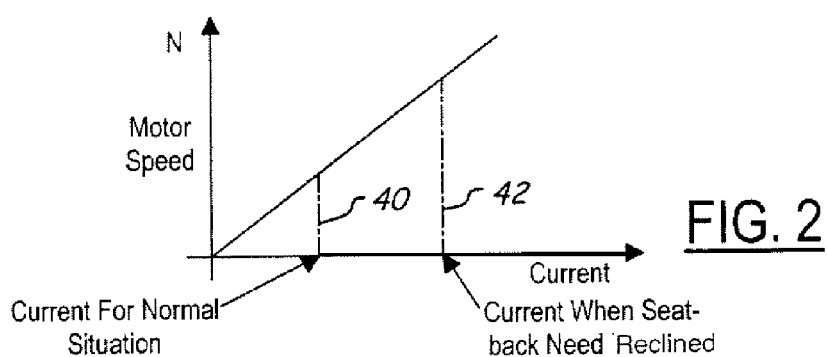
FIG. 2 is a plot of motor speed versus current used to rotate a seat back according to the present invention.

Referring now to FIG. 2, a plot of motor speed versus current is illustrated. Line 40 corresponds to the normal operation through the seat switch 24 shown in FIG. 1. That is, the normal condition provides a low current to move the seat back rotationally with respect to the seat base. Line 42 corresponds to a high current condition that is used to rapidly decline the seat back. In one constructed embodiment the seat back was rotated at 15 degrees per second using the high current illustrated by line 42. This allows sufficient time to move the occupant's head rearward and downward relative to the vehicle body to reduce the potential for injury.

Figure 3:
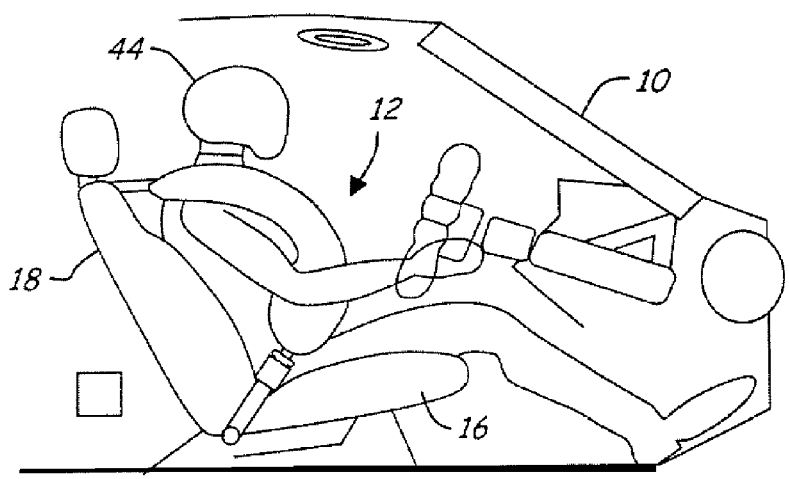
FIG. 3 is a side view of an occupant with a seat back in a first position.

Referring now to FIG. 3, seat 12 with an occupant 44 is illustrated. Seat 12 has seat back 18 in a normal driving position.

Figure 4:
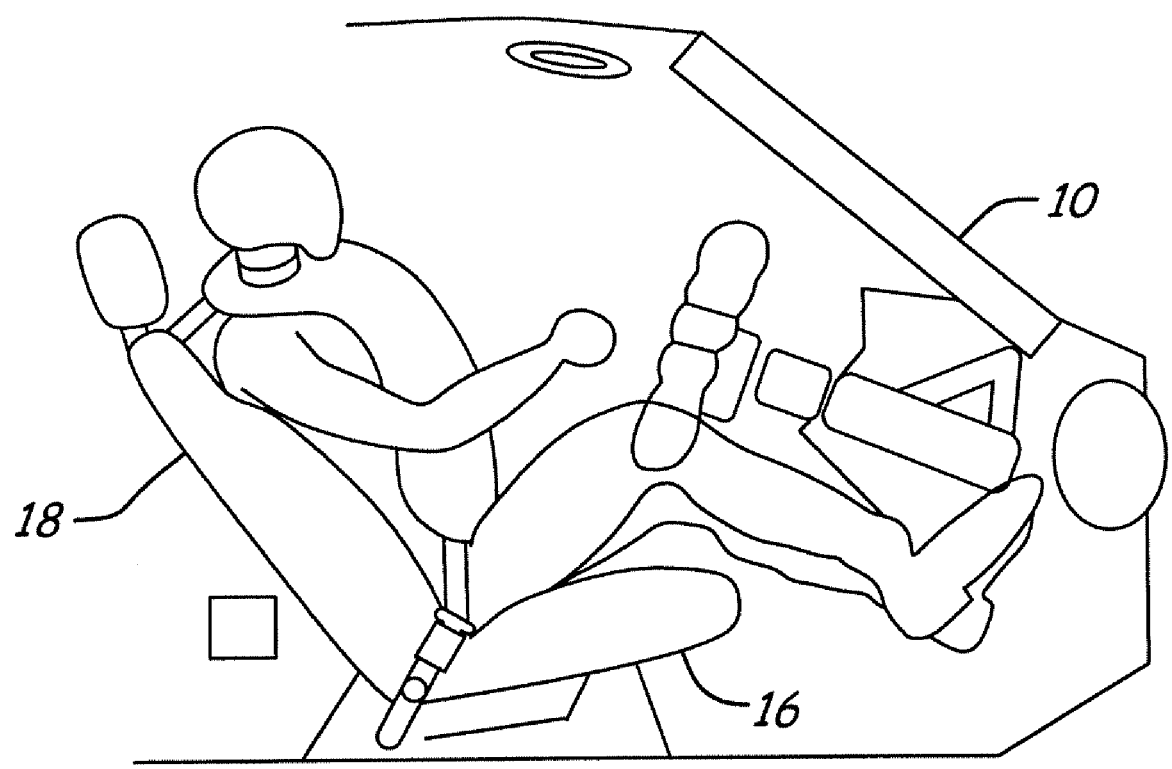
FIG. 4 is a side view of an occupant with a seat back in a second position.

Referring now to FIG. 4, seat back 18 has been rotated to a second position so that the top of the seat back 18 is rotated rearward and downward relative to seat base 16. The motor 22 has thus been provided a high current to move the seat back to its second position illustrated in FIG. 4.

In operation, the rollover control module 26 receives an indication that the vehicle is rolling over from the rollover sensor 30. A roll control signal is generated in roll control module 26 that is used to control the motor 22 to rotate the seat back 18 rearwardly and downward with respect to the seat base 16. Although not required, the seat base 16 may also be moved in response to the rollover signal. Applicant has found, however, that for most situations the seat back 18 may be rotated fast enough and far enough to reduce the potential for injury to the occupant 44.

In addition, the rollover signal generated by the roll control module 26 may be used to control the deployment of the inflatable seat belt 36. Thus, as the seat is rotated rearward 18 the rotatable seat belt 36 urges the occupant 44 against the seat back 18. This insures the desired position of the occupant upon rollover.

While particular embodiments of the invention have been shown and described, numerous variations and alternate embodiments will occur to those skilled in the art. Accordingly, it is intended that the invention be limited only in terms of the appended claims.

The invention claimed is:

1. An occupant restraint system for an automotive vehicle comprising: a rollover sensor generating a rollover signal corresponding to a rolling movement of the vehicle; a seat having a seat base and a seat back rotatably coupled to the seat base; a motor coupled to the seat back; a controller coupled to the rollover sensor and to the motor, said controller controlling the motor to move the seat back relative to the seat base in response to the rollover signal; and a power seat switch providing a first current to the seat back, said controller generating a second current higher than the first current to move the seat back relative to the seat base in response to the rollover signal.

2. A system as recited in claim 1 further comprising an inflatable shoulder belt, said controller deploying the inflatable shoulder belt in response to the rollover signal.

3. A system as recited in claim 1 wherein the rollover sensor is coupled to a rollover control module.

4. A system as recited in claim 1 wherein the controller comprises a rollover control module.

5. An occupant restraint system for an automotive vehicle comprising:
a rollover sensor generating a rollover signal corresponding to a rolling movement of the vehicle;
an inflatable shoulder belt having an airbag;
a seat having a seat base and a seat back rotatably coupled to the seat base;
a motor coupled to the seat back;
a controller coupled to the rollover sensor, said shoulder belt and said motor, said controller controlling the motor to move the seat back relative to the seat base in response to the rollover signal, said controller deploying the inflatable shoulder belt in response to the rollover signal, and with said instant system further comprising a power seat switch providing a first current to the motor, said controller generating a second current higher than the first current to move the seat back relative to the seat base in response to the rollover signal.

6. A system as recited in claim 5 wherein the rollover sensor is coupled to a rollover control module.

7. A system as recited in claim 5 wherein the controller comprises a rollover control module.

8. A method of restraining an occupant during a rollover event comprising:
generating a rollover signal in response to a rolling movement of the vehicle;
rotating the seat back relative to the seat base in response to the rollover signal;
deploying an inflatable shoulder belt in response to the rollover signal and rotating the seat upon activation of a switch with a first current and wherein rotating the seat back comprises rotating the seat back with a second current higher than the first current.

9. A method as recited in claim 8 wherein rotating the seat back comprises rotating the seatback in a rearward direction.

10. A method as recited in claim 8 wherein rotating the seatback comprises controlling a motor coupled to the seat back.

11. A method as recited in claim 8 wherein rotating the seatback comprises controlling a current of a motor coupled to the seat back.

12. A method as recited in claim 8 wherein generating a rollover signal comprises generating a rollover signal at a rollover control module that is coupled to a rollover sensor.

13. A method as recited in claim 8 wherein deploying an inflatable shoulder belt is performed simultaneously with rotating.

14. A method as recited in claim 8 wherein deploying an inflatable shoulder belt comprises urging the occupant against the seat back.

* * * * *